United States Patent
Dore et al.

(10) Patent No.: US 10,958,950 B2
(45) Date of Patent: Mar. 23, 2021

(54) METHOD, APPARATUS AND STREAM OF FORMATTING AN IMMERSIVE VIDEO FOR LEGACY AND IMMERSIVE RENDERING DEVICES

(71) Applicant: InterDigital VC Holdings, Inc., Wilmington, DE (US)

(72) Inventors: Renaud Dore, Rennes (FR); Julien Fleureau, Rennes (FR); Thierry Tapie, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/087,636

(22) PCT Filed: Mar. 14, 2017

(86) PCT No.: PCT/EP2017/055952
§ 371 (c)(1),
(2) Date: Sep. 22, 2018

(87) PCT Pub. No.: WO2017/162479
PCT Pub. Date: Sep. 28, 2017

(65) Prior Publication Data
US 2019/0104330 A1     Apr. 4, 2019

(30) Foreign Application Priority Data
Mar. 22, 2016   (EP) ..................................... 16305321

(51) Int. Cl.
*H04N 21/2343*     (2011.01)
*H04N 21/235*     (2011.01)
(Continued)

(52) U.S. Cl.
CPC ..... *H04N 21/23439* (2013.01); *G06T 3/0043* (2013.01); *H04N 21/2358* (2013.01); *H04N 21/25825* (2013.01)

(58) Field of Classification Search
None
See application file for complete search history.

(56) References Cited

U.S. PATENT DOCUMENTS

2008/0165181 A1   7/2008  Wang
2011/0316963 A1   12/2011 Li et al.
(Continued)

FOREIGN PATENT DOCUMENTS

CN     101771878 A     7/2010
CN     101453639       5/2012
(Continued)

OTHER PUBLICATIONS

Sun et al., "Region of Interest Extraction and Virtual Camera Control Based on Panoramic Video Capturing", IEEE Transactions on Multimedia, vol. 7, No. 5, Oct. 2005, pp. 981-990.
(Continued)

*Primary Examiner* — Xiaolan Xu
(74) *Attorney, Agent, or Firm* — Invention Mine LLC (57) ABSTRACT

The present disclosure relates to methods, apparatus or systems for formatting of backward compatible immersive video streams. At least one legacy rectangular video is captured from an immersive video obtained from a source (82). A set of camera control data are used to determine which parts of the immersive video will constitute legacy videos (84). These part are removed from the immersive video (83) and every prepared videos are packaged in a stream (85). The structure from the stream is a container. Information data about the location and size of removed parts may be added in the stream.

15 Claims, 5 Drawing Sheets

(51) Int. Cl.
   *G06T 3/00*   (2006.01)
   *H04N 21/258*   (2011.01)

(56) References Cited

U.S. PATENT DOCUMENTS

| | | | |
|---|---|---|---|
| 2012/0033039 A1 | 2/2012 | Sasaki et al. | |
| 2012/0092348 A1* | 4/2012 | McCutchen | G06T 3/00 345/474 |
| 2013/0038683 A1 | 2/2013 | Tsukagoshi | |
| 2013/0141523 A1 | 6/2013 | Banta et al. | |
| 2013/0141526 A1 | 6/2013 | Banta et al. | |
| 2013/0265490 A1 | 10/2013 | Krig | |
| 2014/0089990 A1 | 3/2014 | van Deventer et al. | |
| 2014/0232821 A1 | 8/2014 | Chamaret et al. | |
| 2015/0016504 A1 | 1/2015 | Auyeung et al. | |
| 2015/0373341 A1 | 12/2015 | Davies | |
| 2017/0155912 A1* | 6/2017 | Thomas | H04N 21/23439 |
| 2017/0187955 A1* | 6/2017 | Fink | H04N 5/247 |

FOREIGN PATENT DOCUMENTS

| | | |
|---|---|---|
| CN | 104539893 A | 4/2015 |
| CN | 204761606 U | 11/2015 |
| EP | 2824883 | 1/2015 |
| KR | 101282955 | 7/2013 |
| RU | 2533300 C2 | 11/2014 |
| WO | WO2008047054 | 4/2008 |
| WO | WO2014005301 | 1/2014 |
| WO | WO2015197818 | 12/2015 |

OTHER PUBLICATIONS

Seok et al., "Visual-Attention-Aware Progressive RoI Trick Mode Streaming in Interactive Panoramic Video Service", Electronics and Telecommunications Research Institute Journal, vol. 36, No. 2; Apr. 2014, pp. 253-263.

Lin et al., "Low-Overhead Content-Adaptive Spatial Scalability for Scalable Video Coding", IEEE Journal of Selected Topics in Signal Processing, vol. 7, No. 6, Dec. 2013, pp. 1084-1095.

Thomas, E., "Moving Regions of interest signalling in MPD", International Organisation for Standardisation, ISO/IEC JTC1/SC29/WG11, Coding of Moving Pictures and Audio, Document No. MPEG2016/m38032, San Diego, California, USA Feb. 2016, pp. 1-11.

\* cited by examiner

METHOD, APPARATUS AND STREAM OF FORMATTING AN IMMERSIVE VIDEO FOR LEGACY AND IMMERSIVE RENDERING DEVICES

This application claims the benefit, under 35 U.S.C. § 365 of International Application PCT/EP2017/055952, filed Mar. 14, 2017, which was published in accordance with PCT Article 21(2) on Sep. 28, 2017, in English, and which claims the benefit of European Patent Application No. 16305321.8 filed Mar. 22, 2016.

1. TECHNICAL FIELD

The present disclosure relates to the domain of formatting a backward compatible stream representative of an immersive video for example when such a stream is distributed to a heterogeneous set of client devices, some of the client devices being configured to display legacy rectangular videos and some others being configured to display immersive videos.

2. BACKGROUND

Immersive videos are different from legacy videos in that they are displayed around the users instead of being projected on a rectangular screen in front of them. Some devices are configured for rendering only legacy videos (e.g. TV sets, video-projectors), some are configured for rendering only immersive videos (e.g. caves, geodes) and some may render both types of videos according to the decoders they comprises (e.g. head-mounted display devices (HMD), tablets, smartphones). In this document, we call immersive video rendering devices, the devices configured for rendering immersive videos and comprising adapted decoders and legacy video rendering devices, the ones which are not configured for rendering immersive videos or does not comprises adapted decoders.

A video is a sequence of at least one image. Indeed, an image can be considered as a still video. A video is encoded on a rectangular frame that is a two-dimension array of pixels (i.e. element of color information). To be rendered, the frame is, first, mapped on a mapping surface and, second, projected on a screen. A stereoscopic video is encoded on one or two rectangular frames, mapped on two mapping surfaces which are combined to be projected according to the characteristics of the device.

For legacy video rendering devices, the mapping surface and the screen are flat rectangles. Corresponding mapping function and projection function are straightforward. The mapping surface is equivalent to the frame. The screen corresponds to a rectangular part of the mapping surface, depending on the definition and on the resolution of the rendering device.

For immersive video rendering devices, the mapping surface is a three-dimension convex surface (e.g. a sphere, a cube, a pyramid (truncated or not)). The mapping function associates each pixel of the frame to a point of the mapping surface (and vice versa). The projection function depends on the screen of the rendering device. If the screen is a three-dimension convex surface (e.g. caves, geodes), the projection is straightforward from the mapping surface. If the screen is rectangular (e.g. HMD, tablets, smartphones), only a part of the surface is displayed according to the size of the screen and according to the parameters (comprising at least a three-dimension position relative to the mapping surface, an aiming direction and a field of view) of a virtual camera. Such immersive video rendering devices are equipped with a virtual camera controller (e.g. an inertial measurement unit, a positioning system, a mouse, a joystick).

A video stream is prepared and formatted according to the type of rendering device that the video is meant to be rendered on. Legacy video rendering devices do not properly display immersive video as they are not configured to map them on a three-dimension convex mapping surface. Reciprocally, immersive video players do not properly display legacy videos. There is a lack of a format for a backward compatible immersive video stream which could be properly displayed by both legacy and immersive video rendering devices.

3. SUMMARY

The purpose of the present disclosure is to overcome the lack of a format for a backward compatible immersive video stream which could be properly displayed by both legacy and immersive video rendering devices. The present disclosure relates to a method of generating a stream from an immersive video, the method comprising:

Generating at least one first video, each first video being representative of a part of the immersive video;

Generating a second video from the immersive video from which said at least one part has been removed;

Generating the stream by combining together a first syntax element relative to the at least one first video and a second syntax element relative to said second video.

According to a particular characteristic, a third syntax element is added into said stream, said third syntax element being relative to information data representative of a description of said at least one part. According to a specific characteristic, said information data change over the time.

The present disclosure also relates to a device configured to generate a stream from an immersive video, the device comprising:

A video generator to generate at least one first video, each first video being representative of a part of the immersive video;

A video generator to generate a second video from the immersive video from which said at least one part has been removed;

A stream generator to generate the stream by combining together a first syntax element relative to the at least one first video and at a second syntax element relative to said second video.

The present disclosure also relates to a device configured to generate a stream from an immersive video, the device comprising at least one processor configured to:

Generate at least one first video, each first video being representative of a part of the immersive video;

Generate a second video from the immersive video from which said at least one part has been removed;

Generate the stream by combining together a first syntax element relative to the at least one first video and at a second syntax element relative to said second video.

The present disclosure also relates to a stream carrying data representative of an immersive video, the data comprising:

A first syntax element relative to at least one first video, each of said at least one first video being representative of a part of the immersive video;

A second syntax element relative to a second video generated from the immersive video from which said at least one part has been removed.

According to a specific characteristic, a third syntax element relative to information data representative of a description of said at least one part is added into the stream. Advantageously said information data change over the time.

The present disclosure also relates to a method of composing a video for a rendering device from a stream carrying data representative of an immersive video, the method comprising:

When the device is a legacy video rendering device,
Obtaining the video from a first syntax element of the stream relative to at least one first video, each of said at least one first video being representative of a part of the immersive video;

When the device is an immersive video rendering device,
Obtaining at least one first video from a first syntax element of the stream, said at least one first video being representative of a part of the immersive video;
Obtaining a second video from a second syntax element of the stream, said second video being representative of the immersive video from which each said at least one part has been removed;
Composing the video by overlaying each of said at least one first video on the second video.

According to a particular characteristic, said stream further comprises a third syntax element relative to information data representative of a description of said at least one part. When the device is an immersive video rendering device, the composing of the video comprises scaling and translating each first video according to the description of the part associated with said first video for overlaying on the second video.

The present disclosure also relates to a device configured to compose a video from a stream carrying data representative of an immersive video for a rendering device, the device comprising:

When the device is a legacy video rendering device,
Means for obtaining the video from a first syntax element of the stream relative to at least one first video, each of said at least one first video being representative of a part of the immersive video;

When the device is an immersive video rendering device,
Means for obtaining at least one first video from a first syntax element of the stream, said at least one first video being representative of a part of the immersive video;
Means for obtaining a second video from a second syntax element of the stream, said second video being representative of the immersive video from which each said at least one part has been removed;
Means for composing the video by overlaying each of said at least one first video on the second video.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

According to a non-limitative embodiment of the present disclosure, a method and a device to generate a backward compatible video stream representative of an immersive video are described. The format of such a stream is also described. According to another non-limitative embodiment of the present disclosure, rendering devices able to render a video when receiving such a stream and a method that the devices use for composing the video to be rendered according to the format of the stream are presented.

The present disclosure proposes to capture at least one part of the immersive video. This at least one part is removed from the immersive video in order not to be included twice in the stream. This at least one part is further prepared to constitute a legacy video adapted to be rendered by a legacy video rendering device. The immersive video without said at least one part on one hand, and the at least one prepared legacy video on the other hand, are packaged together in the stream. On the rendering device side, when the device is a legacy video rendering device, one of the at least one prepared legacy video is unpackaged and used as the video to be rendered; when the device is an immersive video rendering device, every packaged video are used. The immersive video is unpackaged and each of the at least one prepared legacy video is mapped back on the part from which it has been cut out.

Figure 1:
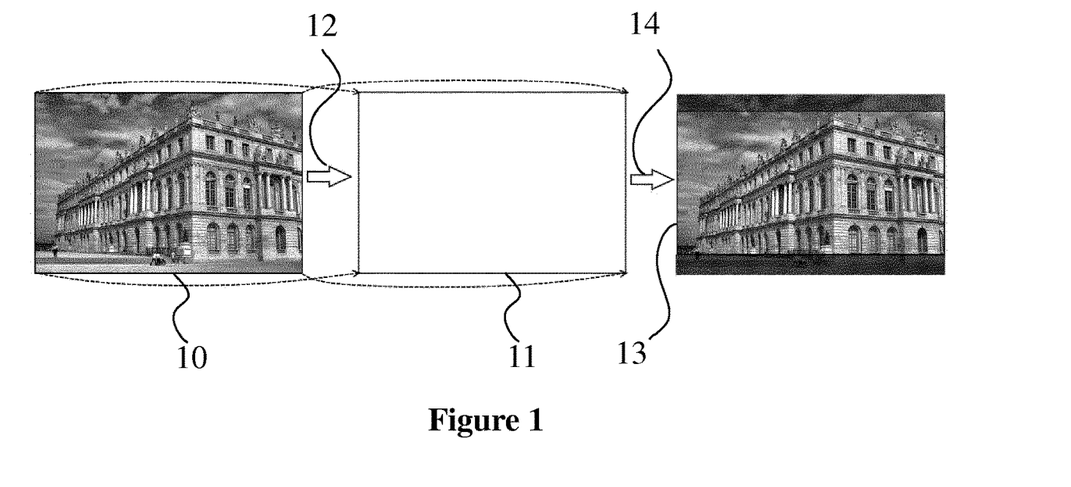
FIG. 1 illustrates an example of the rendering of a legacy video, mapped on a two-dimension mapping surface, according to a specific embodiment of the present principles.

FIG. 1 illustrates an example of the rendering of a legacy video. The sequence of images is encoded on a rectangular frame 10 meant to be mapped on a flat rectangular mapping surface 11. The mapping function 12 is straightforward and the frame 10 and the mapping surface 11 are equivalent. The screen 13 may not have the same resolution and/or definition as the mapping surface 11. As a consequence, the projection function 14 may rescale and/or crop or display black bars at the side of the mapping surface 11. On FIG. 1, the frame 10 and the mapping surface 11 have an aspect ratio of 4:3 while the screen has an aspect ratio of 16:9. In this example, the projection function 14 operates a cropping at the middle of the image to produce a video that fits with the screen 13. In a variant, the projection function 14 adds black bars to the left and right of the mapping surface 11 to obtain a video that fits with the screen 13. In another embodiment, the video of FIG. 1 is stereoscopic. In such a variant, the frame 10 contains two distinct images which are mapped on two distinct mapping surfaces 11. The mapping surfaces are combined according to the type of the screen to render the stereoscopic effect.

Figure 2:
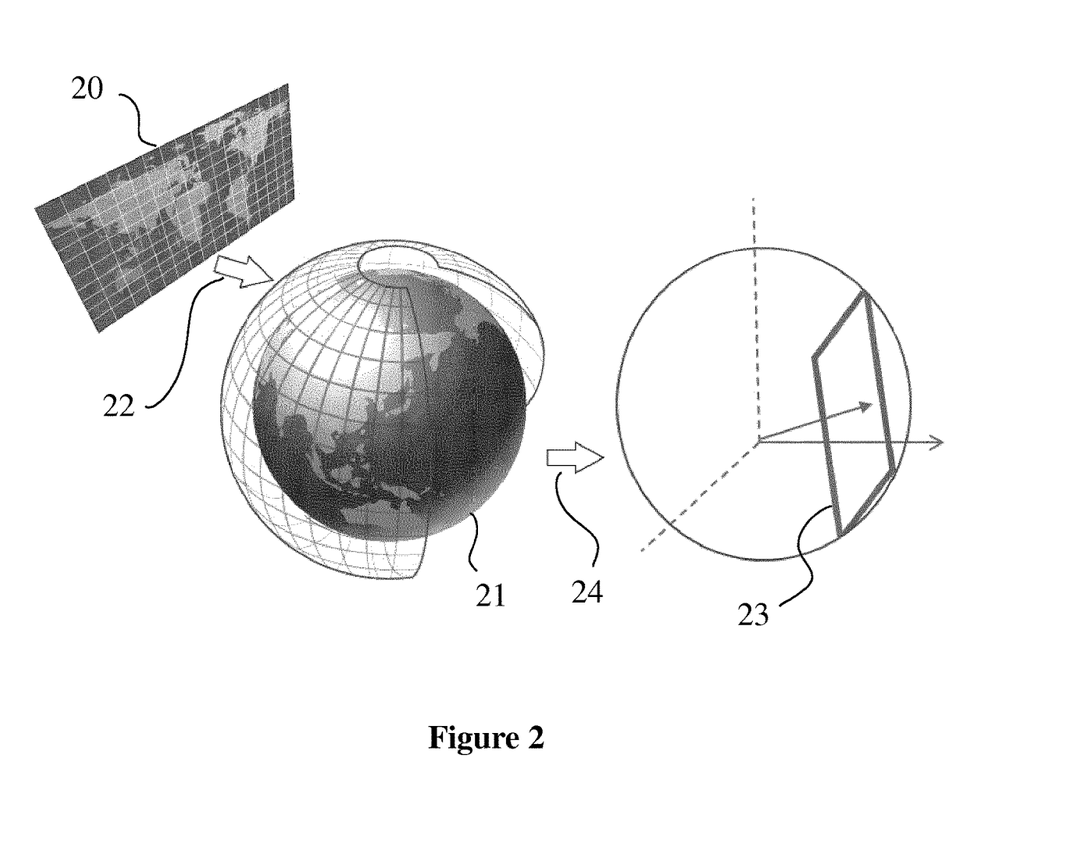
FIG. 2 illustrates an example of the rendering of an immersive video prepared for a spherical mapping surface, the mapping surface being in three-dimension in contrast with the two-dimension mapping surface of FIG. 1, according to a specific embodiment of the present principles.

FIG. 2 illustrates an example of the rendering of an immersive video prepared for a spherical mapping surface. The sequence of images is encoded on a rectangular frame 20 meant to be mapped on a spherical mapping surface 21. The mapping function 22 establishes a mapping between each pixel of the frame 20 and a point on the mapping surface 21 (and vice versa). On FIG. 2, the mapping function 22 is based on the equirectangular projection (also called equidistant cynlindrical projection). The image on the frame 20 is distorted. The distances are respected at the equator and stretched at poles. Straight lines are no longer straight and perspectives are distorted. In variants, the mapping function 22 is based on the equidistant conic projection for instance. If the screen 23 is rectangular, as for head-mounted display devices (HMD) or tablets or smartphones, a part of the mapping surface 21 is selected. The projection function 24 consists in selecting a part of the mapping surface 21 as seen by a camera located at the centre of the sphere, the camera being configured in terms of field of view and resolution in order to produce an image that directly fits with the screen 23. The chosen field of view depends on the characteristics of the display device. For HMD, advantageously, the angle of the field of view is close to the human stereoscopic vision field, which is around one hundred and twenty degrees. The aiming direction of the camera corresponds to the direction the user is looking toward and the virtual camera controller of the immersive video rendering device is used to modify the aiming direction of the camera. In a variant, the video of FIG. 2 is stereoscopic. In such a variant, the frame 20 contains two distinct images which are mapped on two distinct mapping surfaces 21. The mapping surfaces are combined according to the type of the screen to render the stereoscopic effect.

Acquiring a video with a camera placed at the centre of a convex mapping surface generates a video captured from a viewpoint at the centre of this convex mapping surface. In FIG. 2, the sphere is a convex mapping surface and the virtual camera constitutes a viewpoint at the centre of this convex mapping surface from which a video is captured.

Figure 3:
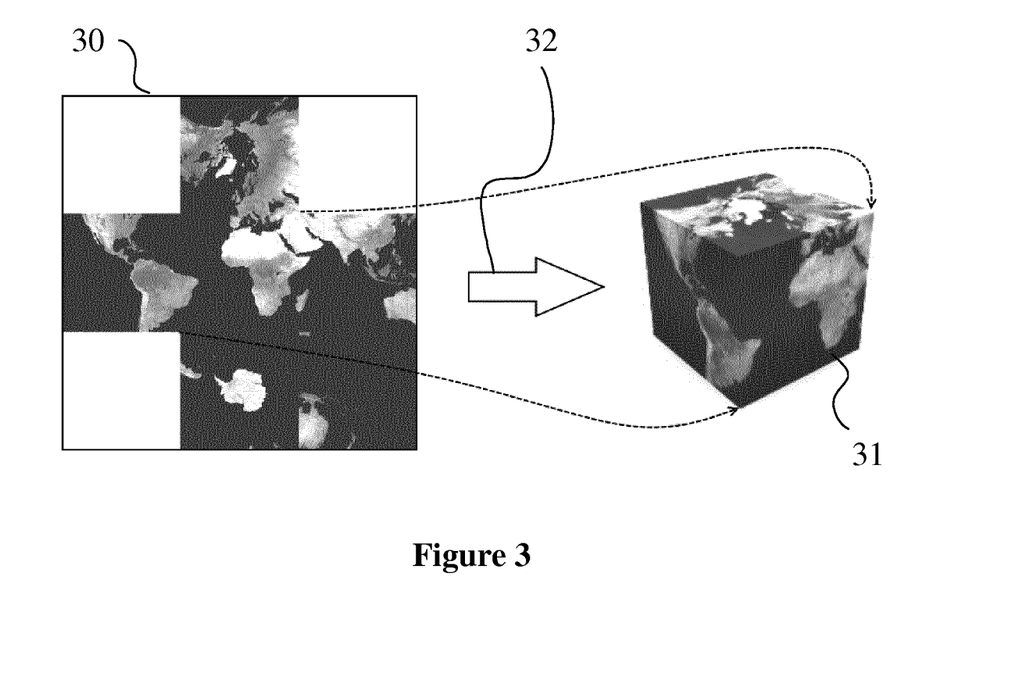
FIG. 3 illustrates an example of the rendering of an immersive video, like in FIG. 2, the immersive video being, in FIG. 3, prepared for a cubical mapping surface, according to a specific embodiment of the present principles.

FIG. 3 illustrates an example of the rendering of an immersive video prepared for a cubical mapping surface. The sequence of images is encoded on a rectangular (or square) frame 30 meant to be mapped on a cubical mapping surface 31. The mapping function 32 establishes a correspondence between squares in the frame 30 and faces of the cube 31. Vice versa, the mapping function determines how the faces of the cube 31 are organized within the surface of the frame 30. Images on each face are not distorted. However, in the total image of the frame 30, lines are piece-wise straight and perspectives are broken. The image may contain empty squares (filled with default or random colour information, white on the example of FIG. 3). The projection function works as the projection function of FIG. 2. A camera is placed at the centre of the cube 31 and captures an image that fits the screen of the rendering device.

In variants, other mapping surfaces and/or mapping functions are used, mapping the video frame on a cylinder or on a pyramid for instance.

Frames 20 and 30 of immersive videos illustrated in FIGS. 2 and 3 are not meant to be mapped on the flat rectangle mapping surface 12 of the FIG. 1. When an immersive video is delivered to a legacy video rendering device, the image on the screen is distorted or piece-wise displayed and corresponds to a visual content larger than the human vision field. Reciprocally, when a legacy video is delivered to an immersive video rendering device, the mapping function produces a distorted image.

In addition, cinematographic grammar of legacy videos is different from the cinematographic grammar of immersive videos. For example, if the scenario includes a dialogue between two characters, an immersive video may display a long still sequence shot: the viewer creates some dynamism by alternatively turning his/her head toward a character and the other. A legacy video may rather alternate tight shots on one and on the other of the characters and wide shots to introduce some dynamism in the scene as the viewer is passive in front of the screen. Such a film editing is however not recommended for an immersive video as frequent cuts may make the viewer loose his/her bearings and even make him/her sick. A legacy video may include zoom effects while zoom effects in immersive videos induce unpleasant vection effect (i.e. illusion of self-motion with distortion of side view).

The present principles propose to capture a legacy video from an immersive video by placing a virtual camera at the centre of the mapping surface that the immersive video is prepared for. Camera controlling data describing parameters for the camera are obtained. These data include at least an aiming direction, an orientation and a size of frustum (horizontal and vertical field of view or angle of view). Camera controlling data are used to control the virtual camera which captures the legacy video from the immersive video. These data are obtained thanks to a manual editing by a film director. In another embodiment, the camera controlling data are automatically edited thanks to algorithms of detection of region of interest in an immersive video. Such algorithms may be based on the analysis of the saliency in the images of the video for instance, or for another example, based on statistics on the head movements of viewers when watching the immersive video with a HMD.

In FIG. 3, the cube is a convex mapping surface and the virtual camera constitutes a viewpoint at the centre of this convex mapping surface from which a video is captured.

Figure 4:
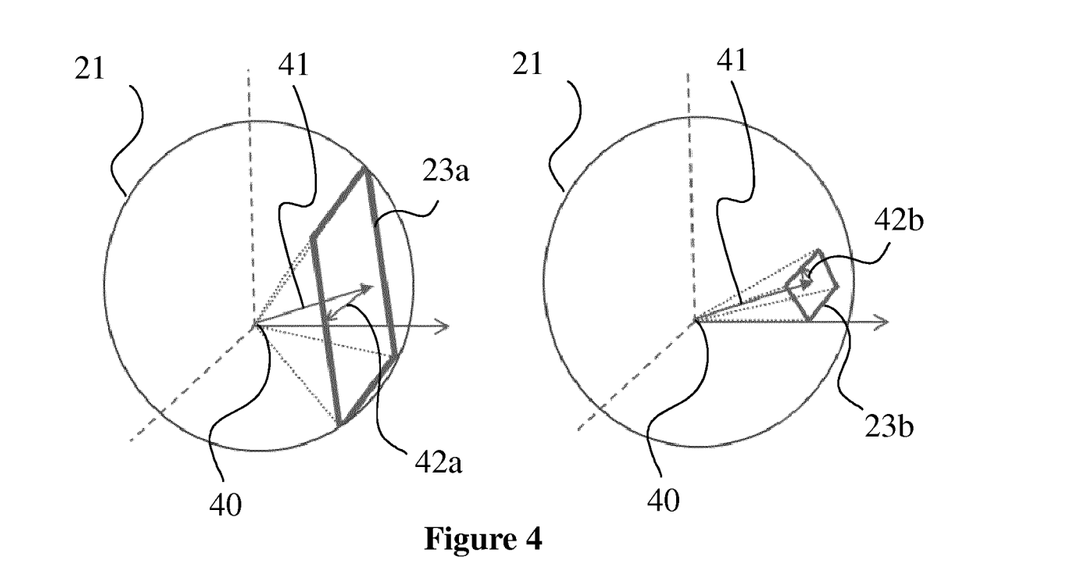
FIG. 4 illustrates an example of capturing a legacy video from an immersive video prepared for a spherical mapping surface like in FIG. 2, according to a specific embodiment of the present principles.

FIG. 4 illustrates an example of capturing a legacy video from an immersive video prepared for a spherical mapping surface. A virtual camera is placed at the centre 40 of the spherical mapping surface 21 (as illustrated in FIG. 2). Camera controlling data are used to direct the camera toward an aiming direction 41 and to tilt the frame of reference of the camera up to an orientation 42a. The part 23a of the immersive video defined by the intersection of the camera frustum and the spherical mapping surface is neither flat (i.e. it is a part of a sphere), nor rectangular (i.e. the edges of the part are curved). To be encoded as a legacy video, the visual content of the part 23a is rectified in order to be mappable on a flat rectangular mapping surface without distortion. The horizontal and vertical angle of view of the camera, obtained from the camera controlling data, determine the size of the camera frustum and, as a consequence, the size of the part 23a. Values for the angle of view parameter has to follow usual values for legacy cameras. Wide shots are obtained with a horizontal angle of view around sixty degrees. Over sixty degrees, wide-angle distortion effects appear. Narrower angles correspond to a zoom in. For small value, resolution issues may arise as the camera is capturing an immersive video with its own maximum resolution. As a consequence, the edition of the camera controlling data has to be done carefully.

Camera controlling data may vary over the time. A sudden change in the value of a parameter corresponds to a cut in the editing of a legacy video. A continuous variation corresponds to a camera effect. For example, a continuous variation in the aiming direction of the camera may correspond to a panning if the background of the immersive video does not rotate toward the same direction at the same speed. Such a continuous variation in the aiming direction of the legacy camera may also be used to compensate a panning in the immersive video and, so, to capture a still shot. Other camera controlling data may vary over the time. As illustrated in FIG. 4, the angle of view may decrease to resize part 23a to part 23b. This effect may correspond to a zoom in. The orientation of the frustum may also vary from direction 42a to direction 42b, operating a camera tilt to the left for example.

Figure 5:
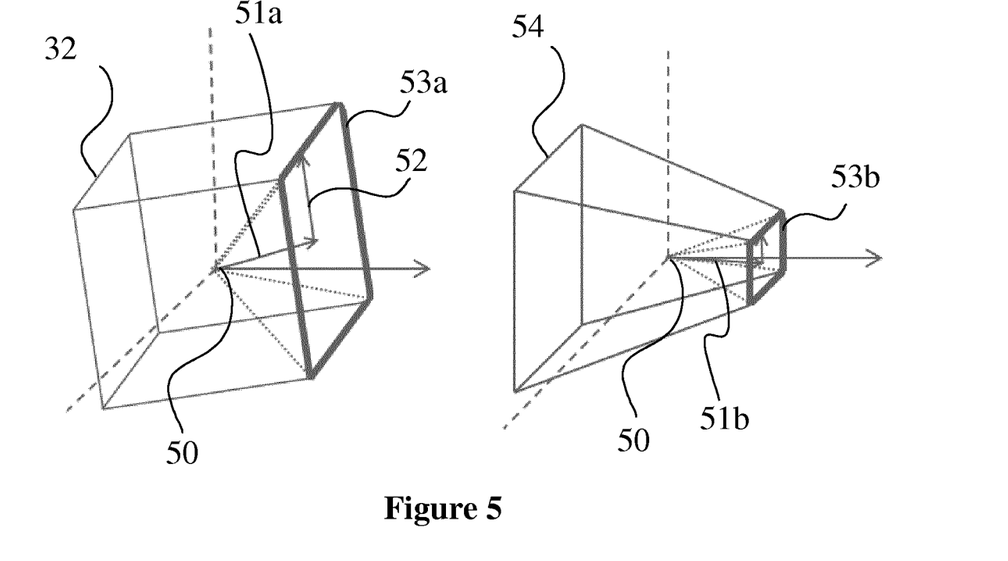
FIG. 5 illustrates an example of capturing a legacy video from an immersive video prepared for a cubical mapping surface like in FIG. 3, according to a specific embodiment of the present principles.

FIG. 5 illustrates an example of capturing a legacy video from an immersive video prepared for a cubical mapping surface. A camera is placed at the centre 50 of the cube 32 (as illustrated on FIG. 3) and captures a legacy video from this point of view according to the camera control data. The captured legacy video is a part of the mapping surface and may be smaller or bigger than a face of the cube and/or may be distributed on several faces of the cube. In a variant, as shown on FIG. 5, the cube is reoriented according to the aiming direction parameter 51a and resized according to the frustum size parameter in order to make the frame 53a of the legacy video fit a face of the cube. The orientation parameter controls the tilting of the cube. If the frame 53a is a rectangle, the mapping surface is adapted in a parallelepipoid. This operation is conditioned to resolution management as a resizing of the faces modifies the area of the mapping surface and the mapping function and, as a consequence, the resolution of the images encoded in the frame.

The camera control data may vary over the time in a sudden or continuous way. FIG. 5 illustrates an example in which the aiming direction varies from a value 51a to a value 51b and the frustum size goes from a value 53a to a value 53b. In this example, the back face of the mapping surface is reoriented to be perpendicular to the aiming direction 53b. The decreasing of the size of the frustum (which corresponds to a zoom in effect) modifies the size of the front face and as a consequence the shape of the side faces. The mapping surface 54 becomes a truncated pyramid leading to a modification of the mapping function (i.e. the way the pixels are organized in the frame of the immersive video).

An advantage of such a transformation of the mapping surface is to facilitate a removing of the part captured for the legacy video from the immersive video. Such a technique allows to minimize the needed area in the frame of the immersive video to encode colour information. Another advantage is that the face of the mapping surface used for the legacy video is already flat and rectangular (i.e. no composition of piece-wise parts is required).

Figure 6:
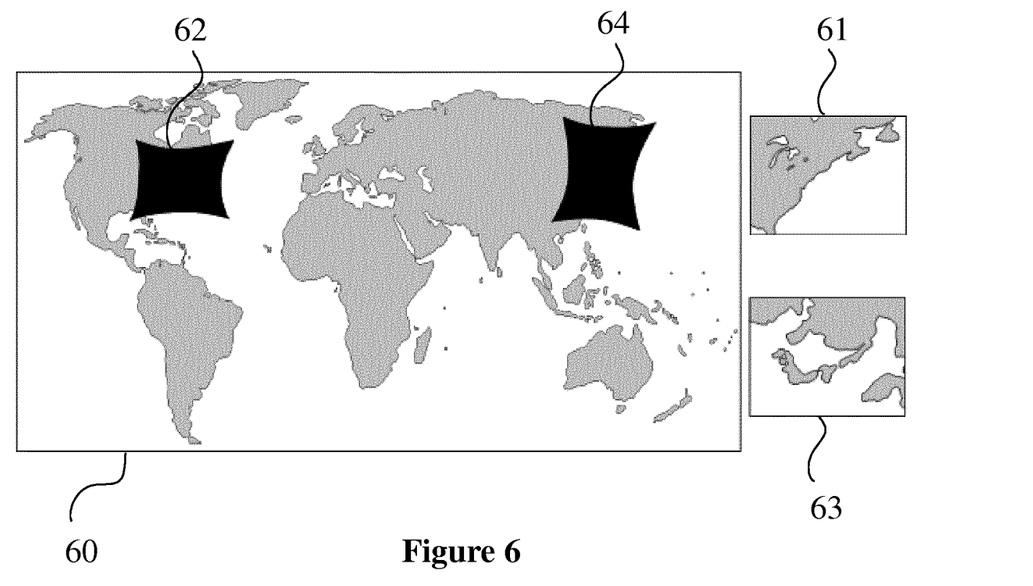
FIG. 6 illustrates an example of two legacy videos captured from the immersive video of FIG. 2 and an example of this immersive video from which the two parts used for said two legacy videos have been removed, according to a specific embodiment of the present principles.

FIG. 6 illustrates an example of two legacy videos 61 and 63 captured from an immersive video 60 and an example of this immersive video from which the two parts used for said two legacy videos have been removed. In the example of FIG. 6, the immersive video is prepared for a spherical mapping surface as illustrated on FIG. 2. A first legacy video 61 (also called first video) is captured by a camera placed at the centre of the mapping sphere and aiming in direction of the part 62 of the immersive video 60. The captured part 62 is rectified in order to constitute a legacy video 61 and is removed from the immersive video 60. In the example of FIG. 6, the removing takes the form of the filling of the area of the part with a default colour. This has the advantage of lightening the compressed version of the frame 60.

The removing of a part from an immersive video may takes different forms according to the mapping surface that the immersive video is prepared for. With immersive videos prepared for parallelepipoid mapping surface for instance, the removing may take the form of a modification of the mapping function in order to optimize (i.e. reduce as much as possible) the area of the frame of the immersive video. As illustrated in FIG. 5, the shape of the mapping surface may be modified. As a consequence, the mapping function changes and the size of the frame is adapted to correspond to the new mapping function.

From one immersive video it is possible to capture several legacy videos (i.e. first videos) with different camera control data. On FIG. 6, a second legacy video 63 is captured from a legacy camera placed at the centre of the sphere and directed by different camera control data. The captured part 64 is rectified in order to constitute a legacy video 63 and is removed from the immersive video 60. With spherical mapping surface, the projection of the captured part on the frame is not rectangular.

Figure 7:
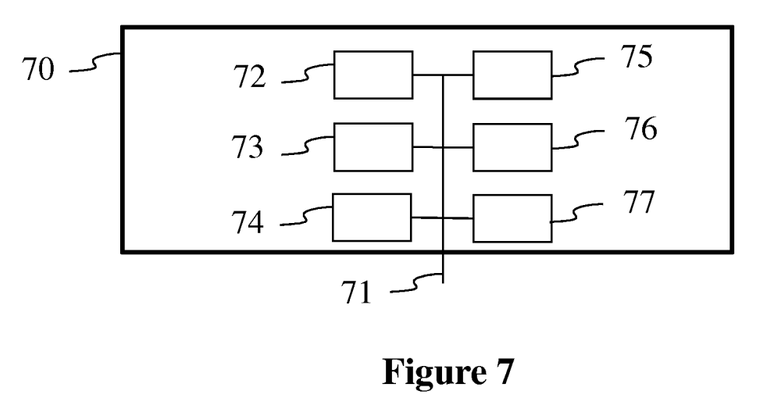
FIG. 7 shows a hardware embodiment of an apparatus configured to implement methods described in relation with FIG. 8 or 9, according to a specific embodiment of the present principles.
Figure 8:
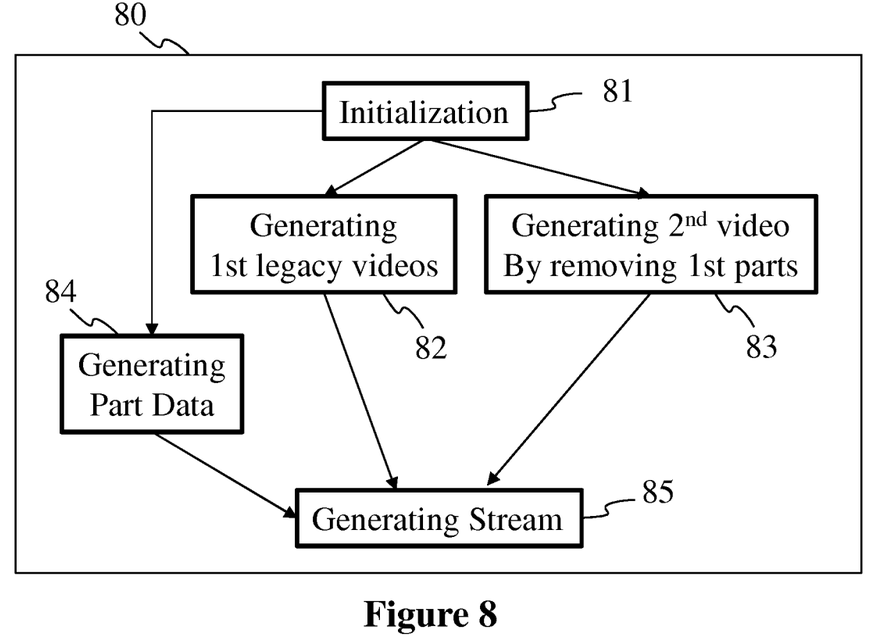
FIG. 8 diagrammatically shows an embodiment of a method of generating the backward compatible immersive video stream of FIGS. 6 and 10 as implemented in a processing device such as the device according to a non-restrictive advantageous embodiment.
Figure 9:
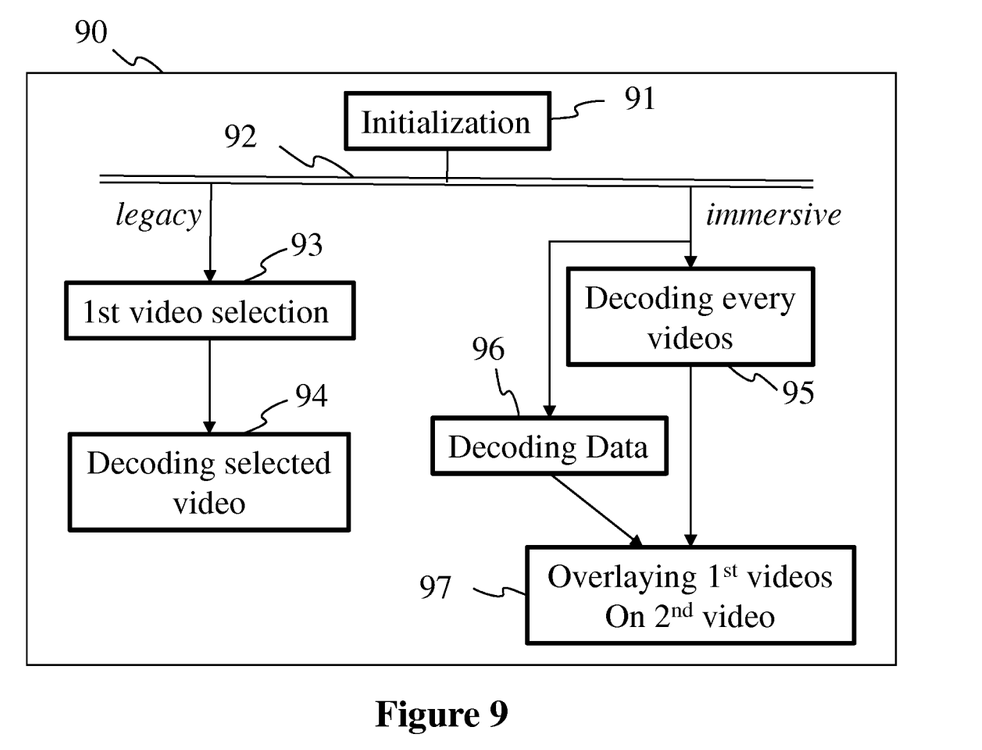
FIG. 9 diagrammatically shows an embodiment of a method of composing a video from a backward compatible immersive video stream as implemented in a processing device such as the device 70 according to a non-restrictive advantageous embodiment.

FIG. 7 shows a hardware embodiment of an apparatus 70 configured to implement methods described in relation with FIG. 8 or 9. In this example, the device 70 comprises the following elements, connected to each other by a bus 71 of addresses and data that also transports a clock signal:
- a microprocessor 72 (or CPU), which is, for example, a DSP (or Digital Signal Processor);
- a non-volatile memory of ROM (Read Only Memory) type 73;
- a Random Access Memory or RAM (74);
- an I/O interface 75 for reception of data to transmit, from an application; and
- a graphics card 76 which may embed registers of random access memory;
- a power source 77.

In accordance with an example, the power source 77 is external to the device. In each of mentioned memory, the word «register» used in the specification may correspond to area of small capacity (some bits) or to very large area (e.g. a whole program or large amount of received or decoded data). The ROM 73 comprises at least a program and parameters. The ROM 73 may store algorithms and instructions to perform techniques in accordance with present principles. When switched on, the CPU 72 uploads the program in the RAM and executes the corresponding instructions.

RAM 74 comprises, in a register, the program executed by the CPU 72 and uploaded after switch on of the device 70, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), set-top-boxes and other devices that facilitate communication of information between end-users.

In accordance with an example of generating a backward compatible immersive video stream as illustrated on FIG. 8, the immersive video and the camera control data are obtained from a source. For example, the source belongs to a set comprising:
- a local memory (73, 74 or 76), e.g. a video memory or a RAM (or Random Access Memory), a flash memory, a ROM (or Read Only Memory), a hard disk;
- a storage interface (75), e.g. an interface with a mass storage, a RAM, a flash memory, a ROM, an optical disc or a magnetic support; and
- a communication interface (75), e.g. a wireline interface (for example a bus interface, a wide area network interface, a local area network interface) or a wireless interface (such as a IEEE 802.11 interface or a Bluetooth® interface).

According to one particular embodiment, the algorithms implementing the steps of a method of generating a backward compatible immersive video stream and described hereafter in FIG. 9 are stored in a memory GRAM of the graphics card 76 associated with the device 70 implementing these steps. According to a variant, a part of the RAM (74) is assigned by the CPU (72) for storage of the algorithms. These steps lead to the generation of a video stream that is sent to a destination belonging to a set comprising a local memory, e.g. a video memory (74), a RAM (74), a ROM (73), a flash memory (73) or a hard disk (73), a storage interface (75), e.g. an interface with a mass storage, a RAM, a ROM, a flash memory, an optical disc or a magnetic support and/or received from a communication interface (75), e.g. an interface to a point to point link, a bus, a point to multipoint link or a broadcast network.

In accordance with examples, device 70 being configured to implement a method of generating a backward compatible immersive video stream described in relation with FIG. 8, belongs to a set comprising:
- a mobile device;
- a communication device;
- a game device;
- a tablet (or tablet computer);
- a laptop;
- an encoding chip;
- a still picture server; and
- a video server (e.g. a broadcast server, a video-on-demand server or a web server).

In accordance with an example of the composing a video from a backward compatible immersive video stream, a stream representative of a backward compatible immersive video is obtained from a source. Exemplarily, the stream is read from a local memory, e.g. a video memory (74), a RAM (74), a ROM (73), a flash memory (73) or a hard disk (73). In a variant, the stream is received from a storage interface (75), e.g. an interface with a mass storage, a RAM, a ROM, a flash memory, an optical disc or a magnetic support and/or received from a communication interface (75), e.g. an interface to a point to point link, a bus, a point to multipoint link or a broadcast network.

According to one particular embodiment, the algorithms implementing the steps of a method of composing a video from a backward compatible immersive video stream for a rendering device and described hereafter in FIG. 9 are stored in a memory GRAM of the graphics card 76 associated with the device 70 implementing these steps. According to a variant, a part of the RAM (74) is assigned by the CPU (72) for storage of the algorithms. These steps lead to the composition of a video that is sent to a destination belonging to a set comprising:
- a mobile device;
- a communication device;
- a game device;
- a set-top-box;
- a TV set;
- a tablet (or tablet computer);
- a laptop;
- a display and
- a decoding chip.

FIG. 8 diagrammatically shows an embodiment of a method 80 of generating a backward compatible immersive video stream as implemented in a processing device such as the device 70 according to a non-restrictive advantageous embodiment.

In an initialization step 81, the device 70 obtains an immersive video from a source. It should be noted that a step of obtaining an information from a source in the present document can be viewed either as a step of reading such an information in a memory unit of an electronic device or as a step of receiving such an information from another electronic device via communication means (e.g. via a wired or a wireless connection or by contact connection). The device 70 loads camera control data from a source. The source of the data may be the same as the source of the immersive video. In a variant, the two sources are different. For example, the camera control data may be stored on a memory of the device 70 (or even written in the program implementing the method) while the immersive video is obtained from a video server.

Steps 82 and 83 are executed in parallel. In a variant, the step 82 is executed before the step 83. In another variant, the step 83 is executed before the step 82. At step 82, the immersive video is mapped on the mapping surface it is prepared for. A virtual camera is placed at the center of the mapping surface. The camera is directed according to the camera control data that determine the part of the immersive video which constitute the visual content of each first legacy video. For each of the first legacy videos, the captured part is encoded as a legacy video and prepared as a video stream. According to a variant, step 82 does not use a virtual camera and cuts out a part of the immersive video frame as obtained from the source, rectifies the visual content if necessary and encodes the computed frame as a legacy video. At step 83, a second immersive video frame is prepared by removing the parts captured for first legacy videos from the immersive video as obtained from the source. As illustrated in FIGS. 4 to 6, the removing of a part from an immersive video may take different forms according to the shape of the mapping surface of the immersive video has been prepared for. Step 83 uses camera control data to determine the shapes of the parts to remove. As for the step 82, it is possible to process this step 83 directly on the frame of the immersive video or to use a virtual camera placed at the center of a mapping surface, the immersive video being mapped on the mapping surface. In another embodiment, steps 82 and 83 are executed on a remote device. First and second videos are prepared by another device and stored on a medium or transmitted to the device 70. The generating steps 82 and 83 consist in obtaining the videos generated on a remote device.

An optional step 84 of encoding information data representative of a description of the parts used to capture first legacy videos is executed in parallel of steps 82 and 83. In a variant, steps 82, 83 and 84 are executed sequentially in any order. In a variant, step 84 is not executed and no data are encoded. These data describe the parts of the immersive video that are removed at step 83. Depending of the mapping surface of the immersive video as reorganized at step 83, said data encode a description on the way and on the location that the first legacy videos has to be mapped in order to retrieve the immersive video as obtained from the source. Information data are related to camera controlling data and to the way the mapping surface has been prepared when capturing first legacy videos.

At step 85, a backward compatible immersive video stream is generated. The at least one first legacy video is packaged in the stream as a first syntax element. The second immersive video is packaged in the stream as a second syntax element. All of the videos are encoded and compressed with an image/video coder, for example a coder with loss like JPEG, JPEG2000, MPEG2, HEVC recommendation ("High Efficiency Video Coding", SERIES H: AUDIOVISUAL AND MULTIMEDIA SYSTEMS, Recommendation ITU-T H.265, Telecommunication Standardization Sector of ITU, April 2013) or H264/AVC recommendation ("Advanced video coding for generic audiovisual Services", SERIES H: AUDIOVISUAL AND MULTIMEDIA SYSTEMS, Recommendation ITU-T H.264, Telecommunication Standardization Sector of ITU, February 2014)). If information data has been generated at step 84, they are added to the stream as a third syntax element. These two or three syntax elements are packaged in a stream container that allow a decoder to retrieve each syntax element independently such as AVI or MPEG4 for instance.

FIG. 9 diagrammatically shows an embodiment of a method 90 of composing a video from a backward compatible immersive video stream as implemented in a processing device such as the device 70 according to a non-restrictive advantageous embodiment.

In an initialization step 91, the device 70 obtains a backward compatible immersive video stream from a source. It is understood that a step of obtaining an information from a source in the present document can be viewed either as a step of reading such an information in a memory unit of an electronic device or as a step of receiving such an information from another electronic device via communication means (e.g. via a wired or a wireless connection or by contact connection).

A condition step 92 is tested. When the device 70 is or is connected to a legacy video rendering device, a step 93 is executed. When the device 70 is or is connected to an immersive video rendering device, a step 95 is executed. In another embodiment, the device 70 is connected to several rendering devices, some being legacy video rendering devices and others being immersive video rendering devices. In such an embodiment, both steps 93 and 95 are executed in parallel and videos composed by each branch of the method is sent to respective rendering devices.

Step 93 consists in extracting one legacy video from the stream. Different syntax elements of a backward compatible immersive video stream are packaged in a container which allow the receiver to independently extract one given syntax element. The container format is, for instance, AVI or MPEG4. If no information about the preferred video to display is present in the headers of the stream, the device 70 is extracting the first of the first syntax elements. When receiving a stream organized by such a container, regular legacy video players are configured for rendering the very first syntax element. An advantage of a backward compatible immersive video stream as described in the present disclosure is to be directly readable by regular legacy video players. Once the syntax element that encodes the selected video is extracted, a step 94 is executed.

At a step 94, the legacy video extracted from the stream is decoded to be sent to the rendering device. This step may include a step of decompression, using a codec, for example MPEG2, HEVC or H264/AVC recommendation. The composed legacy video is sent to the rendering device connected to the device 70. In a variant, the device 70 is a legacy video rendering device and the composed video is displayed on the screen of the device 70.

At step 95, every first syntax elements and the second syntax element of the stream are extracted from the stream and decoded. Each first syntax element is used to decode a legacy video. The second element of syntax is used to decode an immersive video from which at least one part has been removed. When a third element of syntax is present in the stream, a step 96 is executed in parallel. In a variant, the step 96 is executed before or after the step 95. At step 96, the third syntax element of the stream is extracted from the stream and information data are decoded. These information data represent description elements including the shape, location and size of parts that has been removed from the immersive video to generate the second syntax element.

A step 97 consists in composing an immersive video from the frames of extracted videos at step 95. If no third syntax element has been found in the stream's structure, information data are set by default. Each frame of first legacy videos is distorted, rescaled and translated accordingly to information data. After this operation, these modified frames fill the parts of the immersive video they have been removed from when the stream has been generated. These modified frames are overlaid on the second immersive video frame. The result of this step is an immersive video frame without removed part. This resulting frame is mapped on the mapping surface of the immersive video. In a variant, the overlaying is done on the mapping surface. In another embodiment, the device 70 is able to track the part of the immersive video viewed by the user and overlay first legacy videos on the immersive video only if the corresponding parts belong to the field of view of the user (or a part lightly bigger).

Figure 10:
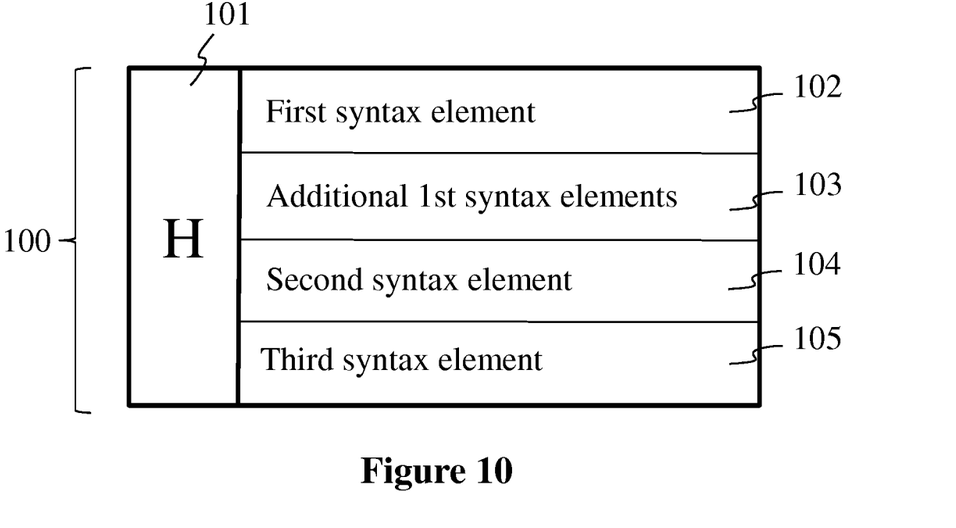
FIG. 10 shows an example structure of a backward compatible immersive video stream of FIG. 6, according to a specific embodiment of the present principles.

FIG. 10 shows an example structure 100 of a backward compatible immersive video stream. The structure consists in a container which organizes the stream in independent syntax elements. The structure may contain a header part 101 which is a set of data common to every syntax elements of the stream. For example, the header part contains metadata about syntax elements, describing the nature and the role of each of them. For instance, the header part may contain an information about the preferred first legacy video to be extracted by legacy video players. A backward compatible immersive video stream contains a first element of syntax 102 which is relative to a first legacy video, this video being representative of a part of the immersive video. This first syntax element 102 is mandatory in the stream and, when no information about a preferred legacy video is present in the header part, this first syntax element 102 is considered as the preferred legacy video by default. Additional first syntax elements 103 may be added in the stream by a generating method as illustrated in FIG. 8. Each of these additional first syntax elements is relative to a first legacy video, this video being representative of a part of the immersive video. The preferred legacy video may be one of these additional syntax element of the stream if designated as the preferred one in the header part. A second element of syntax 104 is mandatory and is relative to a second immersive video generated from the immersive video from which said at least one part has been removed. This second syntax element 104 has a header part that contains information about the mapping surface and the mapping function the second immersive video is prepared for. In a variant, the header part of the second syntax element 104 is gathered with the header part 101 of the stream. According to another embodiment, this information varies over the time and is synchronized with the second immersive video. The information may be included along the second syntax element instead of in a header part.

An optional third syntax element 105, which is relative to information data representative of a description of said at least one part, may be included in the structure of the stream. These information data represent description elements including the shape, location and size of parts that has been removed from the immersive video to generate the second syntax element. In a variant, these information data vary over the time and are synchronized with the second immersive video of the second syntax element.

Naturally, the present disclosure is not limited to the embodiments previously described. In particular, the present disclosure is not limited to a method of generating a backward compatible immersive video stream and a method of composing a video from a backward compatible immersive video stream for a rendering device. The implementation of calculations necessary to generate such a stream or to compose a video from such a stream are not limited to an implementation in a CPU but also extends to an implementation in any program type, for example programs that can be executed by a GPU type microprocessor.

The implementations described herein may be implemented in, for example, a method or a process, an apparatus, a software program, a data stream or a signal. Even if only discussed in the context of a single form of implementation (for example, discussed only as a method or an apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, smartphones, tablets, computers, mobile phones, portable/personal digital assistants ("PDAs"), video servers, set-to-boxes and other devices.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating a stream from an immersive video prepared for a convex mapping surface, the method comprising:
   generating at least one first video, wherein a frame of a first video is a part of a given frame of the immersive video and is rectified to map a flat rectangular mapping surface;
   generating a second video, wherein the second video is the immersive video in which parts corresponding to the at least one first video are replaced by a default content, wherein a shape of the parts depends on the convex mapping surface; and
   generating the stream comprising a first syntax element relative to the at least one first video and a second syntax element relative to the second video.

2. The method of claim 1, the stream further comprising a third syntax element comprising metadata representative of a description of the parts corresponding to the at least one first video.

3. The method of claim 2, wherein the metadata change over time.

4. The method of claim 2, wherein generating the at least one first video further comprises reorienting the mapping surface according to the metadata.

5. A device configured to generate a stream from an immersive video prepared for a convex mapping surface, the device comprising:
   a video generator configured to generate at least one first video, wherein a frame of a first video is a part of a frame of the immersive video and is rectified to map a flat rectangular mapping surface;
   a video generator configured to generate a second video from the immersive video in which parts corresponding to the at least one first video are replaced by a default content, wherein a shape of the parts depends on the convex mapping surface; and
   a stream generator configured to generate the stream comprising a first syntax element relative to the at least one first video and at a second syntax element relative to the second video.

6. The device of claim 5, wherein the stream generator is further configured to add a third syntax element into the stream, the third syntax element relative to metadata representative of a description of the parts corresponding to the at least one first video.

7. The device of claim 6, wherein the metadata change over time.

8. A non-transitory computer storage medium having stored instructions, when executed by a processor, to perform a method of generating a stream from an immersive video prepared for a convex mapping surface, the method comprising:
   generating at least one first video, wherein a frame of a first video is a part of a given frame of the immersive video and is rectified to map a flat rectangular mapping surface;
   generating a second video, wherein the second video is the immersive video in which parts corresponding to the at least one first video are replaced by a default content, wherein a shape of the parts depends on the convex mapping surface; and
   generating the stream comprising metadata comprising:
      a first syntax element relative to at least one first video, wherein a frame of a first video is a part of a frame of an immersive video prepared for a convex mapping surface, wherein the frame is rectified to map a flat rectangular surface; and
      a second syntax element relative to a second video, wherein the second video is the immersive video in which parts corresponding to the at least one first video are replaced by a default content, wherein the shape of the parts depends on the convex mapping surface.

9. The non-transitory computer storage medium of claim 8, wherein the metadata further comprises a third syntax element relative to metadata representative of a description of the parts corresponding to the at least one first video.

10. A method of composing a video for a rendering device from a stream carrying metadata representative of an immersive video prepared for a convex mapping surface, the method comprising:
    obtaining, from a first syntax element of the stream, at least one first video, wherein a frame of a first video is a part of a frame of the immersive video and is rectified to map a flat rectangular mapping surface;
    obtaining a second video from a second syntax element of the stream, wherein the second video is the immersive video from which the parts corresponding to the at least one first video are replaced by a default content, wherein a shape of the parts depends on the convex mapping surface; and
    composing the video by overlaying the at least one first video on the second video.

11. The method of claim 10, wherein the stream further comprises a third syntax element comprising metadata representative of a description of the parts corresponding to the at least one first video.

12. The method of claim 11, wherein the composing of the video comprises distorting, scaling, and translating each first video according to the description of the parts corresponding to the at least one first video for overlaying on the second video.

13. A device configured to compose a video from a stream carrying metadata representative of an immersive video prepared for a convex mapping surface for a rendering device, the device comprising a memory associated with a processor configured to:
    obtain, from a first syntax element of the stream, at least one first video, wherein a frame of a first video is a part of a frame of the immersive video and is rectified to map a flat rectangular surface; and
    obtain a second video from a second syntax element of the stream, wherein the second video is the immersive video from which parts corresponding to the at least one first video are replaced by a default content, wherein a shape of the parts depends on the convex mapping surface; and
    compose the video by overlaying each of the at least one first video on the second video.

14. The device of claim 13, wherein the stream further comprises a third syntax element comprising metadata representative of a description of the parts corresponding to the at least one first video.

15. The device of claim 14, wherein the composing of the video comprises distorting, scaling, and translating each first video according to the description of the parts corresponding to the at least one first video for overlaying on the second video.

* * * * *